(12) United States Patent
Pasca et al.

(10) Patent No.: US 10,656,413 B2
(45) Date of Patent: May 19, 2020

(54) HEAD-UP DISPLAY

(71) Applicant: CONTINENTAL AUTOMOTIVE GmbH, München (DE)

(72) Inventors: Andrei Pasca, Timisoara (RO); Ferenc Markus, Timisoara (RO)

(73) Assignee: Continental Automotive GmbH, Hannover (DE)

( * ) Notice: Subject to any disclaimer, the term of this patent is extended or adjusted under 35 U.S.C. 154(b) by 158 days.

(21) Appl. No.: 15/562,745

(22) PCT Filed: Apr. 1, 2016

(86) PCT No.: PCT/EP2016/057192
§ 371 (c)(1),
(2) Date: Sep. 28, 2017

(87) PCT Pub. No.: WO2016/156560
PCT Pub. Date: Oct. 6, 2016

(65) Prior Publication Data
US 2018/0081173 A1 Mar. 22, 2018

(30) Foreign Application Priority Data
Apr. 2, 2015 (EP) .................................... 15465508

(51) Int. Cl.
*G02B 27/01* (2006.01)
*G02B 27/00* (2006.01)
*G02B 27/14* (2006.01)

(52) U.S. Cl.
CPC ..... *G02B 27/0101* (2013.01); *G02B 27/0018* (2013.01); *G02B 27/0149* (2013.01); *G02B 27/142* (2013.01); *G02B 2027/012* (2013.01); *G02B 2027/0121* (2013.01); *G02B 2027/0194* (2013.01)

(58) Field of Classification Search
CPC ...... G02B 27/01–0189; G02B 27/0101; G02B 27/0018; G02B 27/0149; G02B 27/142; G02B 2027/012; G02B 2027/0121; G02B 2027/0194
USPC .................................................. 359/630, 629
See application file for complete search history.

(56) References Cited

U.S. PATENT DOCUMENTS

| 4,831,366 A | 5/1989 | Iino |
| 5,194,989 A | 3/1993 | Ferrante et al. |
| 5,237,455 A | 8/1993 | Bordo et al. |

(Continued)

FOREIGN PATENT DOCUMENTS

| FR | 2 689 651 | 10/1993 | |
| WO | WO-2014174970 A1 * | 10/2014 | ............. B60K 35/00 |

OTHER PUBLICATIONS

Search Report dated Feb. 4, 2016 which issued in the corresponding European Patent Application No. 15465508.8.

(Continued)

*Primary Examiner* — William R Alexander
(74) *Attorney, Agent, or Firm* — Cozen O'Connor

(57) ABSTRACT

A combiner, a head-up display module, and to a vehicle with a head-up display module. To improve the image quality of a head-up display, a combiner is provided that has a transparent sheet. The transparent sheet is configured to reflect a projected image toward a user. The transparent sheet has a thickness less than 1 mm.

15 Claims, 4 Drawing Sheets

(56) References Cited

U.S. PATENT DOCUMENTS

| | | | | |
|---|---|---|---|---|
| 5,734,357 | A * | 3/1998 | Matsumoto | G02B 27/01 345/7 |
| 7,158,095 | B2 * | 1/2007 | Jenson | G02B 27/0101 345/207 |
| 8,622,549 | B2 * | 1/2014 | Linden | G02B 27/283 353/20 |
| 8,804,247 | B2 * | 8/2014 | Sugiyama | B60K 35/00 359/630 |
| 2002/0089757 | A1 * | 7/2002 | Bignolles | G02B 27/0101 359/630 |
| 2002/0141077 | A1 * | 10/2002 | Nakamura | G02B 27/0149 359/817 |
| 2004/0109251 | A1 * | 6/2004 | Freeman | B32B 3/02 359/894 |
| 2005/0012682 | A1 * | 1/2005 | Jenson | G02B 27/0101 345/7 |
| 2005/0041297 | A1 * | 2/2005 | He | G02B 27/01 359/631 |
| 2006/0007055 | A1 * | 1/2006 | Larson | G02B 27/0101 345/8 |
| 2010/0214194 | A1 * | 8/2010 | Kanou | B32B 17/10036 345/4 |
| 2011/0267701 | A1 * | 11/2011 | Moussa | G02B 27/0101 359/630 |
| 2012/0162734 | A1 * | 6/2012 | Lambert | G02B 27/0103 359/13 |
| 2013/0027781 | A1 | 1/2013 | Eckardt et al. | |
| 2013/0038935 | A1 * | 2/2013 | Moussa | G02B 5/32 359/567 |
| 2013/0329302 | A1 | 12/2013 | Thales | |
| 2015/0098133 | A1 * | 4/2015 | Laycock | G02B 7/1827 359/632 |
| 2016/0070100 | A1 * | 3/2016 | Miura | B60K 35/00 359/630 |
| 2016/0187650 | A1 * | 6/2016 | Mills | G02B 5/223 345/8 |

OTHER PUBLICATIONS

Search Report dated Sep. 9, 2016 which issued in International Patent Application No. PCT/EP2016/057192.

* cited by examiner

HEAD-UP DISPLAY

CROSS REFERENCE TO RELATED APPLICATIONS

This is a U.S. national stage of application No. PCT/EP2016/057192, filed on Apr. 1, 2016. Priority is claimed on European Application No. EP15465508, filed Apr. 2, 2015, the content of which is here by reference.

BACKGROUND OF THE INVENTION

1. Field of the Invention

The present invention relates to the field of automotive applications. In particular, this invention relates to a combiner, to a head-up display module, and to a vehicle with such a display module.

2. Description of the Prior Art

Head-up displays are used in a vehicle to visualize information, such as speed and warning signals. A head-up display may comprise a transparent screen placed in front of an end-user, which screen serves to reflect a projected image and aids the formation of a virtual image containing the information in front of the end-user. An important performance aspect of the head-up displays is the quality of the virtual image provided by the transparent screen.

SUMMARY OF THE INVENTION

It is an object of one aspect of the present invention to provide a head-up display with improved image quality.

It should be noted that the following described aspects of the invention apply for the combiner, for the head-up display module, and for the vehicle.

According to one aspect of the invention, there is provided a combiner for a head-up display module for a vehicle. The combiner comprises a transparent sheet. The transparent sheet is configured to reflect a projected image toward a user. The transparent sheet has a thickness of less than 1 mm.

As an advantage, the projected double image effect—a brighter main image and a "ghost image" with less brightness—as a result of the reflection of two parallel surfaces of the combiner may be reduced, thus increasing the legibility of the projected image, such as symbols, presented to a viewer, e.g. a driver. This is because the reduction of the thickness of the transparent sheet (or screen) can move the ghost image in the same position as the main image (or at least move the ghost image closer to the main image) as seen from the viewer's position. In other words, the offset between the main image and the ghost image is reduced such that the main image and the ghost image (or at least a large part of the two images) overlap. Additionally, since the thickness of the combiner screen is small, even in the presence of process variability, the distance between the ghost image and the main image may still be below the discernability threshold. This leads to increased allowable process tolerances, and hence, in high process yield and low cost.

As a further advantage, by using less material during the fabrication of the head-up display screen, the costs of the screen may be decreased.

According to an aspect of the invention, the thickness is constant across the transparent sheet.

As an advantage, the combiner has a simple geometry with constant thickness. Other specific geometries, e.g. an increasing thickness along the vertical direction of the screen, may be more difficult to manufacture.

As a further advantage, the constant thickness of the screen enables the combiner to be formed with the aid of a punching process. Individual screens can be obtained from a large mother sheet that is cut according to the required shapes. On the other hand, if the screen would have a special geometry, such as an increasing thickness, the application of a punching process may not be possible, since different parts obtained from the same sheet would have a different average thickness, and would shift the ghost image in different positions as seen from a driver.

As a still further advantage, the flat geometry may also reduce the manufacturing and assembly costs given by the increased allowable process tolerances.

According to an embodiment of the invention, the combiner further comprises a support structure. The transparent sheet is mounted on the support structure such that the support structure provides mechanical support for the transparent sheet. Also, this structure may give the transparent sheet a curvature to further enhance the optical behaviour, or may leave it flat.

As an advantage, the support structure provides mechanical support or mechanical strength for the transparent sheet.

According to an embodiment of the invention, the support structure comprises a first pin and a second pin. The first and second pins are disposed on opposing sides of the transparent sheet.

According to an embodiment of the invention, the support structure is a frame surrounding the transparent sheet.

Advantageously, the frame defines the shape of the combiner screen and provides mechanical support to the transparent sheet. The shape of the transparent sheet (or screen) may be square, rectangular, circular, oval, and any other desired geometry. The frame may be made from any suitable material. Contemplated materials include metal, wood, plastics, and other compositions that provide sufficient stiffness for supporting the transparent sheet. The transparent sheet may also be mounted on the frame in many ways including, for example, attaching and fastening.

According to an embodiment of the invention, the frame and the transparent sheet are formed of the same material and in a single piece.

As an advantage, the same material, such as plastics, is used to provide the mechanical support as well as the required low thickness of the combiner screen, i.e. the transparent sheet.

According to an embodiment of the invention, the support structure is provided as a part of a vehicle dashboard module.

As an advantage, no additional separate mechanical support may be required. The transparent sheet may be integrated or removably mounted on the vehicle dashboard module.

According to an embodiment of the invention, the transparent sheet comprises a first surface and a second surface for reflecting the projected image. The first and second surfaces are configured to have different reflectivity.

As an advantage, by adjusting the reflectivity of the first and second surfaces, the brightness of the main virtual image may be increased and the brightness of the ghost image may be reduced. This may further increase the quality of the main virtual image and enhance the legibility of the symbols presented to the driver.

According to one aspect of the invention, a head-up display module for a vehicle is provided. The head-up display module comprises an image projector and a combiner according to one of the embodiments described above and in the following. The image projector is configured to project an image toward the combiner.

The combiner is configured to reflect the projected image toward a user.

According to one aspect of the invention, a vehicle is provided that comprises a head-up display module according to the second aspect, or its embodiments.

According to one aspect of the invention, a cockpit display for an airplane is provided that comprises a head-up display module according to the second aspect, or its embodiments.

In the following application, the term "head-up display", also referred to as a "HUD", may concern an element for providing information to a vehicle driver optically, without the driver having to move his field of view from the road significantly. The HUD may be projected directly onto the car windscreen, or alternatively it may be projected onto a combiner screen resting on top of the car dashboard, for example.

The term "combiner", or combiner HUD, may refer to a transparent screen, e.g. a small plastic screen, between the steering wheel and the windscreen for reflecting a projected image to a user, such as a driver. The combiner may blend the data displayed with the scenery in a way that it appears as a virtual image in a distance of about e.g. 2 meters in front of the driver. It is noted that the combiner as outlined in the following description relates to a separate combiner, in contrast to windshield HUDs, which project the virtual image to the windscreen, i.e. the windshield.

The term "projected image" relates to the image projected to the combiner screen, which image may contain navigation information and the vehicle's current speed. In addition, projected image may incorporate current speed limits and other local traffic regulations, provided optionally by a camera-based traffic sign recognition system.

The term "transparent", or translucent, means that the transparent sheet is clear, or transparent enough to allow light to pass through, or to allow the viewer to see through.

Therefore, it may be seen as a gist of the invention that the thickness of combiner HUDs is reduced, which allows the double image effect (due to the reflection of the two parallel surfaces of combiner HUDs) to be reduced or even cancelled. Further, combiner HUDs have a simple geometry of constant thickness, which may allow a high throughput fabrication process and reduced manufacturing and assembly costs.

These and other aspects of the present invention will become apparent from and elucidated with reference to the embodiments described hereinafter.

Exemplary embodiments of the present invention will now be described in the following, with reference to the following drawings.

DETAILED DESCRIPTION OF THE EMBODIMENTS

Figure 1:
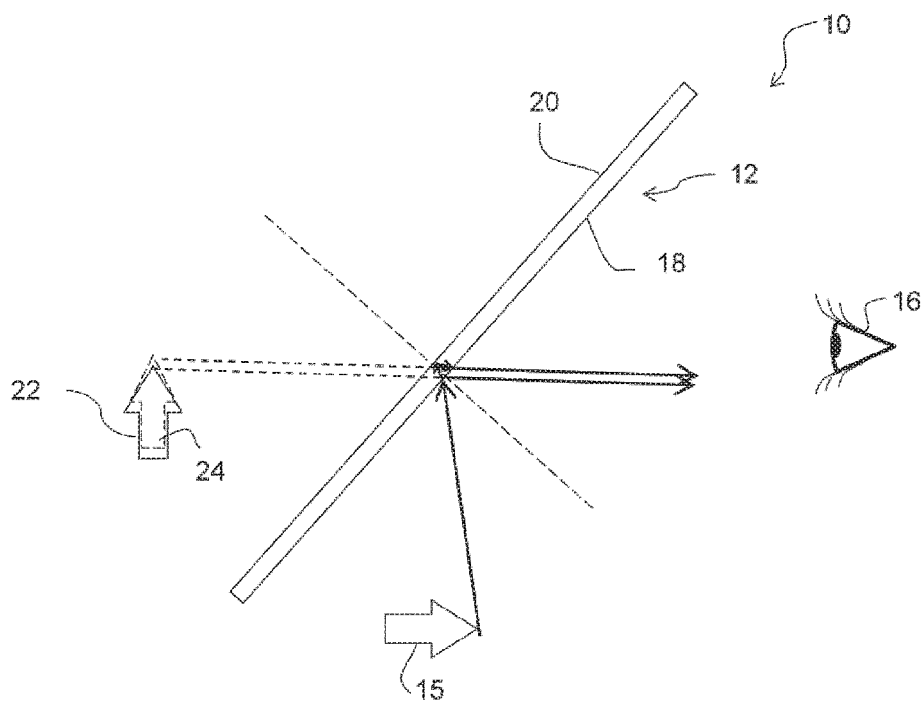
FIG. 1 is a side-view of an exemplary embodiment of a combiner.

FIG. 1 shows a side-view of an exemplary embodiment of a combiner 10. The combiner comprises a transparent sheet 12. The transparent sheet 12 is configured to reflect a projected image, indicated with a white arrow 15, to a user 16, e.g. a driver.

The transparent sheet 12 has a thickness of less than 1 mm. In a further example, the thickness is less than 500 µm. In a still further example, the thickness is less than 250 µm.

The required thickness of the transparent sheet 12 is dependent on the desired image quality. Based on the desired quality factor Q, given D, the distance between the user 16 and the projected double image 22 or 24, $n_1$, the refractive index of the combiner 12, $n_0$, the refractive index of air and $\alpha$, the incidence angle of the light beams coming from the image 15 towards the combiner 12, the combiner thickness t is upper-bounded by the following inequality:

$$t < D \cdot \frac{\pi}{180} \cdot Q \cdot \frac{n_1}{n_0} \cdot \frac{\sqrt{1 - \left(\frac{n_0}{n_1}\right)^2 \cdot \sin^2(\alpha)}}{\sin(2 \cdot \alpha)}$$

The quality factor Q is defined as the size of the minimum details that can be correctly perceived by the human eye. In an embodiment, the quality factor Q has a value of 1/60, which is 60 individual elements per one degree of field of view. In a further example, the quality factor Q has a value of 1/90. In yet another example, the quality factor Q has a value of 1/120.

The transparent sheet 12 comprises two parallel surfaces, i.e. a first surface 18 and a second surface 20. During operation, an image 15 (see also FIG. 5) incorporating e.g. general driving information like speed limits and navigation directions and urgent warning signals, is projected to the first surface 18 of the combiner screen (also the second surface 20), which in turn reflects the projected image toward the user 16, or the so-called eye box—the area where the eyes of the drivers are located. The user 16 thus observes the projected image 15 in such a way that it appears to be about e.g. two meters away—or, in other words, a virtual image. However, as both surfaces 18 and 20 take part in the reflection process, the user 16 will observe two virtual images—a main virtual image 22 (brighter image) and a ghost virtual image 24 with a reduced brightness. For illustration purposes, the main virtual image 22 is indicated with a solid white arrow, while the ghost virtual image 24 is indicated with a dotted white arrow. The presence of the ghost virtual image 24 reduces the legibility of the information in the main virtual image 22 presented to the user 16.

The distance between the main virtual image 22 and the ghost virtual image 24 depends on the thickness of the transparent sheet 12. By reducing the thickness of the transparent sheet 12, the ghost virtual image 24 moves toward to the main virtual image 22. If the thickness is small enough, the main virtual image 22 and the ghost virtual image 24 overlap with each other and the distance between them is small enough to be indiscernible from the nominal viewing distance, i.e. in the driving position. For example, for a viewing distance of 2 meters between the virtual image projected by the combiner and the viewer, a person with a very good visual acuity of, for example, 20/10 may not be able to make a distinction between the main and the ghost virtual images, if they are separated by less than 290 µm. If the combiner is placed at half this distance, i.e. 1 meter, and the angle between the combiner and the line of sight is 45 degrees, the required thickness for the transparent sheet of the combiner is around 190 µm. It is noted that these values are merely exemplary. Any other values that meet the quality criteria for double image suppression imposed by the application are still in the spirit of the present invention.

As an option, as shown in FIG. 1, the thickness is constant across the transparent sheet 12. In other words, the combiner 10 has a simple geometry of constant thickness.

The thin, flat geometry of the transparent sheet, i.e. the combiner screen, of the combiner provides a high image quality by suppressing double virtual images with increased allowable process tolerances, thus allowing for the use of a high throughput fabrication process and low manufacturing and assembly costs.

It will be appreciated that the transparent sheet can be made from a thin sheet of transparent material having certain rigidity or from a plastic transparent foil. It is noted that the term "plastic" is used to denote the physical properties of the material—that is, it's the behavior under mechanical forces—and may not refer to the chemical composition of the material. The transparent sheet is fabricated in an appropriate manner. For example, individual combiners may be produced from a large foil by a blade cutting process or from an initial mother sheet, from which individual pre-shaped screens are punched and then hot pressed to the desired thickness.

Since the mechanical strength of such a thin structure may not be well suited for in-vehicle applications, a support structure may be provided for providing the desired mechanical performances.

Figure 2:
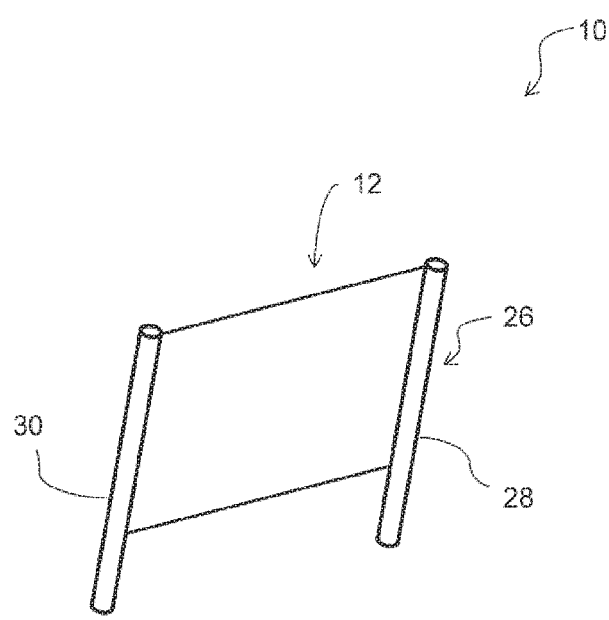
FIG. 2 is a schematic view of an exemplary embodiment of a combiner with a mechanical support in form of pins.

FIG. 2 shows an example of providing the desired mechanical performances, in which the combiner 10 further comprises a support structure 26. The transparent sheet 12 is mounted on the support structure 26 such that the support structure 26 provides mechanical support for the transparent sheet 12.

"Mounting" the transparent sheet to the support structure may refer to securely attaching, affixing, fastening or any other suitable ways to fix the transparent sheet to the support structure.

In an example, shown in FIG. 2 as an option, the support structure 26 comprises a first pin 28 and a second pin 30. The first 28 and second 30 pins are disposed on opposing sides of the transparent sheet 12. In other words, the transparent sheet 12, i.e. the display or screen, is maintained in its position with the aid of the two pins 28, 30 placed on the sides of the display.

The term "pin" may refer to a component or a device for assisting in holding or supporting the transparent sheet. For example, FIG. 2 shows two rod-shaped mechanical pins.

Although not shown in FIG. 2, the support structure 26 may further comprise a third, a fourth, or more pins.

Figure 3A:
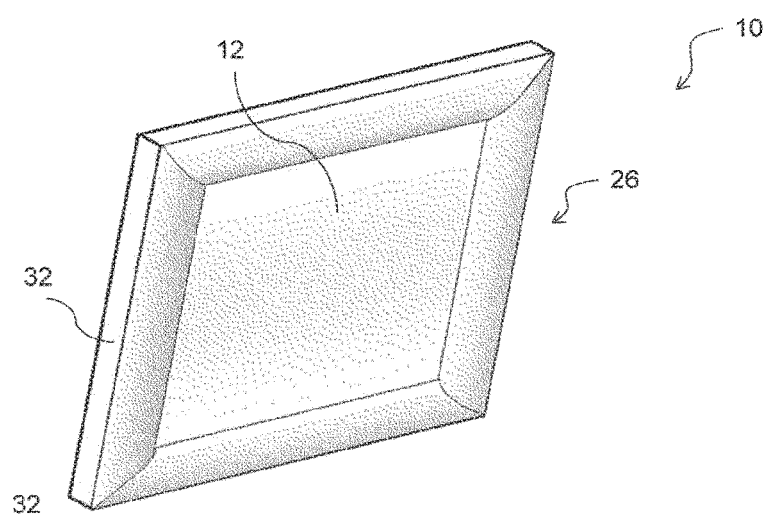
FIG. 3A is a schematic view of an exemplary embodiment of a combiner with a mechanical support in form of a frame.

FIG. 3A shows a further example, in which the support structure 26 is a frame 32 surrounding the transparent sheet 12.

The frame 32 defines the shape of the transparent sheet 12, or screen. Although the transparent sheet 12 has a square shape in FIG. 2, it is to be appreciated that the shape of the screen may also be rectangular, circular, oval, or have any other desired geometry.

Figure 3B:
FIG. 3B is a side-view of FIG. 3A.

As an option, the frame 32 and the transparent sheet 12 are formed of the same material and in a single piece. For example, as illustrated in FIG. 3B (cross-sectional view of FIG. 3A), the central area—i.e. the transparent sheet 12 or the screen—is recessed with respect to the sides of the combiner 10. In this way, the central part, i.e. the transparent sheet 12, of the combiner 10 provides the needed thickness to produce the single virtual image, while the external, thicker frame 32 of the same material provides the required rigidity.

The single piece structure may be fabricated with the aid of a punching process that cuts pre-shaped combiners from a larger mother sheet, followed by another processing step of hot stamping or pressing, in which the recessed area is formed.

Figure 4:
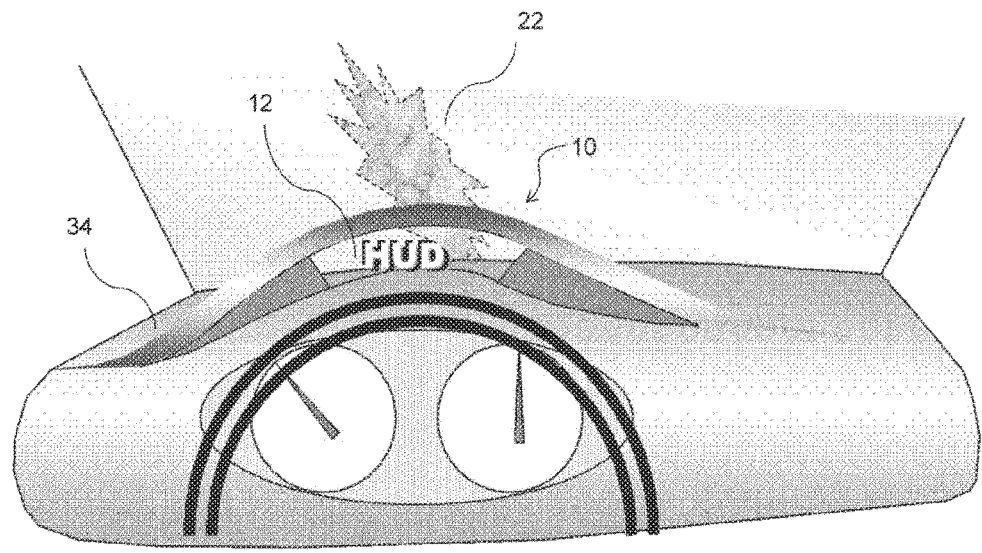
FIG. 4 is a schematic view of an exemplary embodiment of a combiner with a mechanical support in form of a vehicle dashboard module.

FIG. 4 shows a still further example, in which the support structure 26 is provided as a part of a vehicle dashboard module 34.

For example, as shown in FIG. 4, the transparent sheet 12 of the combiner 10 is integrated in the decorative elements of the vehicle dashboard module 34. In this way, the transparent sheet 12 provides the screen for the HUD, while the decorative elements provide the required mechanical strength.

It will be appreciated that transparent sheet 12 can, of course, be mounted to the vehicle dash board module. For example, the transparent sheet may be obtained by blade cutting from a large roll and then it may be attached to the vehicle dashboard module 34 with the aid of a gluing process.

As a further option to the above-mentioned embodiments, surface treatment steps are applied to the transparent sheet 12, such as increasing the reflectivity of the first surface 18 and/or decreasing the reflectivity of the second surface 20 in order to increase the brightness of the main virtual image and to reduce the brightness of the ghost virtual image.

Figure 5:
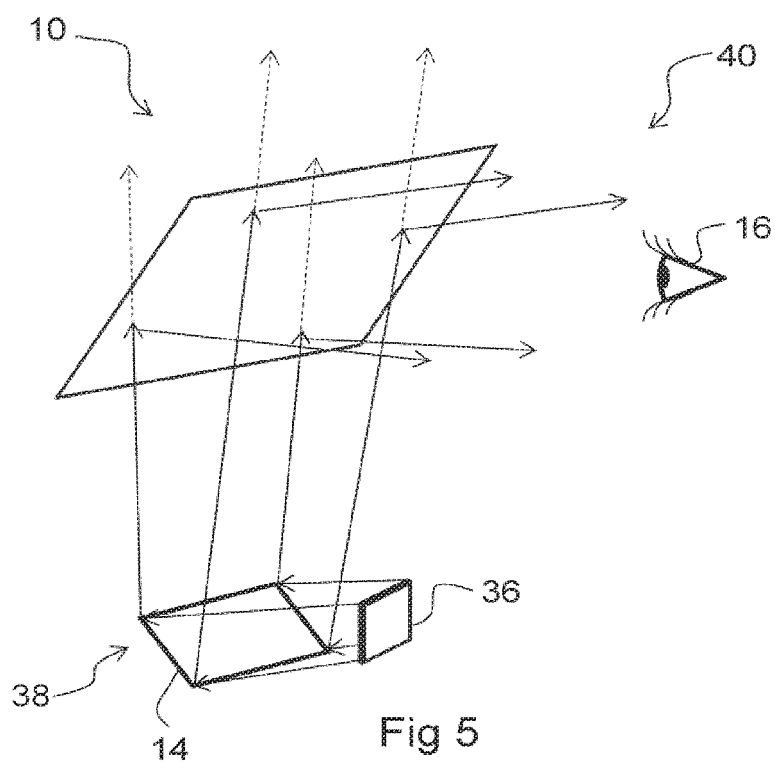
FIG. 5 is a schematic view of an exemplary embodiment of a head-up display module.

FIG. 5 shows an example of a head-up display module 40. The head-up display module 40 comprises an image projector 36 and the combiner 10 according to one of the above-mentioned embodiments. The image projector 36 is configured to project an image 15 toward the combiner 10. The combiner 10 is configured to reflect the projected image 15 toward a user 16.

Also illustrated in FIG. 5 is a generic optical arrangement 38, such as a series of folding mirrors 14, which is provided to deflect light and in turn to project the image 15 to the combiner 10.

Figure 6:
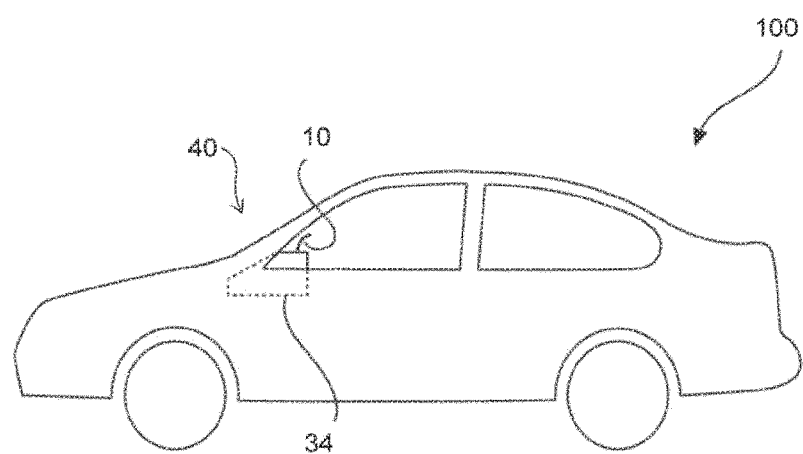
FIG. 6 is a schematic view of an exemplary embodiment of a vehicle.

FIG. 6 shows an example of a vehicle 100 comprising the head-up display module 40.

As an option, the combiner 10 of the head-up display module 40 in mounted on the vehicle dashboard module 34.

It will be appreciated that the head-up display module 40 may be disposed in any suitable position. The head-up display module 40 may also be adjusted horizontally or vertically for optimal viewing.

Further, it is to be appreciated that the combiner may have different dimensions to meet different requirements, e.g. a small combiner for deployment in compact cars. The dimensions as illustrated in the Figures are merely for the purposes of illustration.

According to a further embodiment (not shown), a cockpit display for an airplane is provided that comprises a head-up display module according to the second aspect, or its embodiments.

The preceding detailed description is merely exemplary in nature, and is not intended to limit the application and uses.

Furthermore, there is no intention to be bound by any theory presented in the preceding background or summary or the preceding detailed description.

It should be noted that the term "comprising" does not rule out a plurality of elements. It is further noted that features described with reference to one of the above exemplary embodiments can also be used in combination with other features of other exemplary embodiments described above.

Moreover, while at least one exemplary embodiment has been presented in the foregoing summary and detailed description, it should be appreciated that a vast number of variations exist.

The exemplary embodiments outlined are examples, and are not intended to limit the scope, applicability or configuration in any way.

Rather, the foregoing summary and detailed description will provide those skilled in the art with a convenient teaching for implementing an exemplary embodiment, it being understood that various changes may be made in the function and arrangement of the elements described in the exemplary embodiment without departing from the scope as set forth in the appended claims and their legal equivalents.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A combiner for a head-up display module for a vehicle, comprising:
   a transparent sheet having two parallel sides with a thickness of less than 1 mm, and configured to reflect a projected image toward a user,
   wherein each side projects a respective image and a distance between the respective images is below a discernable threshold.

2. The combiner according to claim 1, wherein the thickness is constant across the transparent sheet.

3. The combiner according to claim 1, further comprising:
   a support structure;
   wherein the transparent sheet is mounted on the support structure such that the support structure provides mechanical support for the transparent sheet.

4. The combiner according to claim 3, wherein the support structure comprises:
   a first pin; and
   a second pin;
   wherein the first and second pins are disposed on opposing sides of the transparent sheet.

5. The combiner according to claim 3, wherein the support structure is a frame surrounding the transparent sheet.

6. The combiner according to claim 5, wherein the frame and the transparent sheet are formed of a same material and in a single piece.

7. The combiner according to claim 3, wherein the support structure is a part of a vehicle dashboard module.

8. The combiner according to claim 1, wherein the first and second surfaces are configured to have different reflectivity.

9. The combiner according to claim 1, wherein the thickness is less than 500 μm.

10. The combiner according to claim 1, wherein the thickness is less than 250 μm.

11. The combiner according to claim 1, wherein the combiner thickness t is upper-bounded by:

$$t < D \cdot \frac{\pi}{180} \cdot Q \cdot \frac{n_1}{n_0} \cdot \frac{\sqrt{1 - \left(\frac{n_0}{n_1}\right)^2 \cdot \sin^2(\alpha)}}{\sin(2 \cdot \alpha)}$$

where:
  t is the combiner thickness,
  Q is a quality factor
  D is a distance between a user and a projected double image;
  $n_1$ is a refractive index of the combiner;
  $n_0$ is a refractive index of air;
  α is an incidence angle of light beams coming from the image towards the combiner.

12. A head-up display module for a vehicle, comprising:
   an image projector; and
   a combiner comprising a transparent sheet having two parallel sides with a thickness of less than 1 mm, and configured to reflect a projected image toward a user, wherein each side projects a respective image and a distance between the respective images is below a discernable threshold;
   wherein the image projector is configured to project the projected image toward the combiner.

13. A vehicle, comprising:
   a head-up display module, comprising:
     an image projector; and
     a combiner comprising a transparent sheet having two parallel sides with a thickness of less than 1 mm, and configured to reflect a projected image toward a user, wherein each side projects a respective image and a distance between the respective images is below a discernable threshold; and
     wherein the image projector is configured to project the projected image toward the combiner.

14. A cockpit display for an airplane, comprising a head-up display module, comprising:
   an image projector; and
   a combiner comprising a transparent sheet having a thickness of less than 1 mm, and configured to reflect a projected image to a user on each of its two parallel sides;
   wherein the image projector is configured to project the projected image toward the combiner.

15. The cockpit display for an airplane according to claim 14, wherein each side of the combiner projects a respective image and a distance between the respective images is below a discernable threshold.

* * * * *